United States Patent [19]

Kamel et al.

[11] Patent Number: 4,688,091

[45] Date of Patent: Aug. 18, 1987

[54] SPACECRAFT CAMERA IMAGE REGISTRATION

[75] Inventors: Ahmed A. Kamel, Sunnyvale; Donald W. Graul, San Mateo; Fred N. T. Chan, Atherton; Donald W. Gamble, Palo Alto, all of Calif.

[73] Assignee: Ford Aerospace & Communications Corporation, Detroit, Mich.

[21] Appl. No.: 860,373

[22] Filed: May 6, 1986

[51] Int. Cl.$^4$ .............................................. H04N 7/01
[52] U.S. Cl. ...................... 358/109; 358/107; 358/140; 358/160; 358/180; 382/45
[58] Field of Search ............... 358/103, 107, 109, 140, 358/160, 180; 370/104; 382/45; 33/320

[56] References Cited

U.S. PATENT DOCUMENTS

| | | | |
|---|---|---|---|
| 3,223,777 | 12/1965 | Crawford et al. | 358/53 |
| 3,676,581 | 7/1972 | Swet | 358/53 |
| 3,716,669 | 2/1973 | Watanabe | 358/109 |
| 3,769,710 | 11/1973 | Reister | 33/320 |
| 3,859,460 | 1/1975 | Westell | 358/125 |
| 3,952,151 | 4/1976 | Jenkin | 358/109 |
| 4,012,018 | 3/1977 | Lorell et al. | 244/165 |
| 4,300,159 | 11/1981 | Hummer et al. | 358/109 |
| 4,439,788 | 3/1984 | Frame | 358/109 |
| 4,593,317 | 6/1986 | Heydlauff | 358/140 |
| 4,602,375 | 7/1986 | Inukai | 370/104 |
| 4,630,111 | 12/1986 | Blain | 358/160 |
| 4,639,774 | 1/1987 | Fried | 358/109 |

OTHER PUBLICATIONS

D. W. Graul, Oral Presentation accompanied by a posterboard display before the Environmental Research Institute of Michigan at its International Symposium on Remote Sensing of the Environment, Oct. 21, 1985.

"New GOES to Sharpen Severe Weather Tracking", *Aviation Week and Space Technology*, Dec. 23, 1985.

A. Schwalb, "Envirosat-2000 Report; GOES-Next Overview", National Oceanic and Atmospheric Administration, Sep., 1985, pp. 25, 26, 28, 32, 35, 36.

*Primary Examiner*—Howard W. Britton
*Attorney, Agent, or Firm*—Edward J. Radlo; Keith L. Zerschling

[57] ABSTRACT

A system for achieving spacecraft camera (1, 2) image registration comprises a portion external to the spacecraft and an image motion compensation system (IMCS) portion onboard the spacecraft. Within the IMCS, a computer (38) calculates an image registration compensation signal (60) which is sent to the scan control loops (84, 88, 94, 98) of the onboard cameras (1, 2). At the location external to the spacecraft, the long-term orbital and attitude perturbations on the spacecraft are modeled. Coefficients (K, A) from this model are periodically sent to the onboard computer (38) by means of a command unit (39). The coefficients (K, A) take into account observations of stars and landmarks made by the spacecraft cameras (1, 2) themselves. The computer (38) takes as inputs the updated coefficients (K, A) plus synchronization information indicating the mirror position (AZ, EL) of each of the spacecraft cameras (1, 2), operating mode, and starting and stopping status of the scan lines generated by these cameras (1, 2), and generates in response thereto the image registration compensation signal (60). The sources of periodic thermal errors on the spacecraft are discussed. The system is checked by calculating "measurement residuals", the difference between the landmark and star locations predicted at the external location and the landmark and star locations as measured by the spacecraft cameras (1, 2).

9 Claims, 8 Drawing Figures

GOES IJKLM SATELLITE

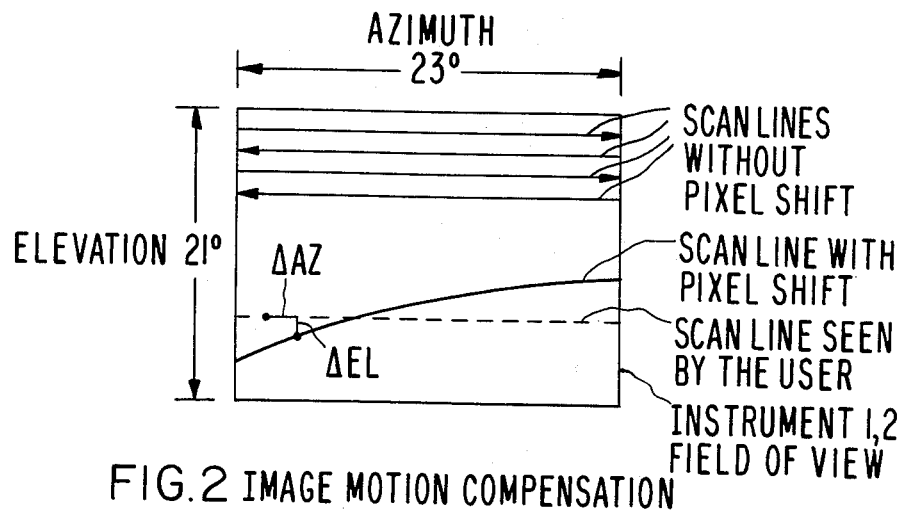
FIG. 2 IMAGE MOTION COMPENSATION AT SOURCE
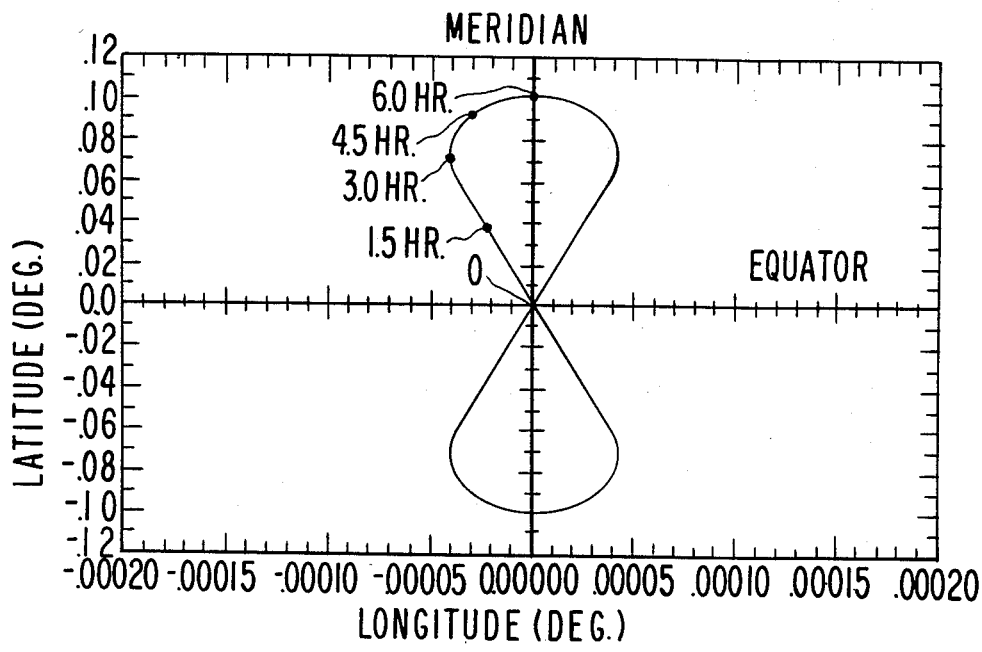
FIG. 3 SATELLITE GROUND TRACK DUE TO 0.1 DEGREE INCLINATION

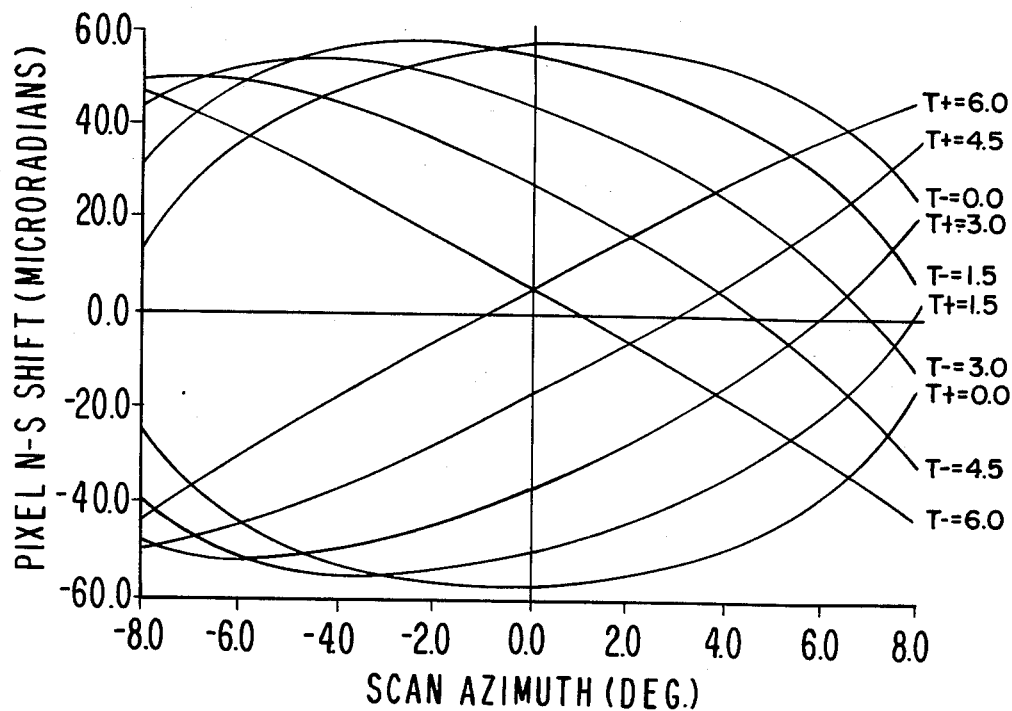
FIG. 4 N-S PIXEL SHIFT GROWTH WITHIN THE 85-MINUTE IMAGING OR SOUNDING INTERVAL AS A FUNCTION OF SCAN AZIMUTH FOR A SCAN ELEVATION OF 0 DEGREES

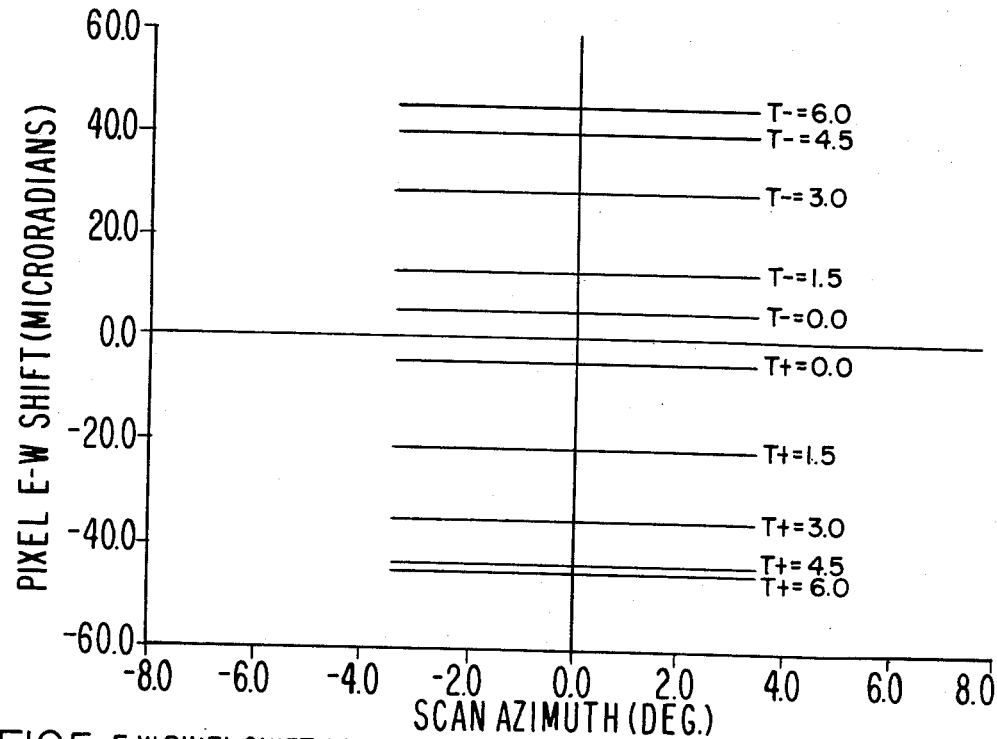
FIG.5 E-W PIXEL SHIFT GROWTH WITHIN THE 85-MINUTE IMAGING OR SOUNDING INTERVAL AS A FUNCTION OF SCAN AZIMUTH FOR A SCAN ELEVATION OF 8°
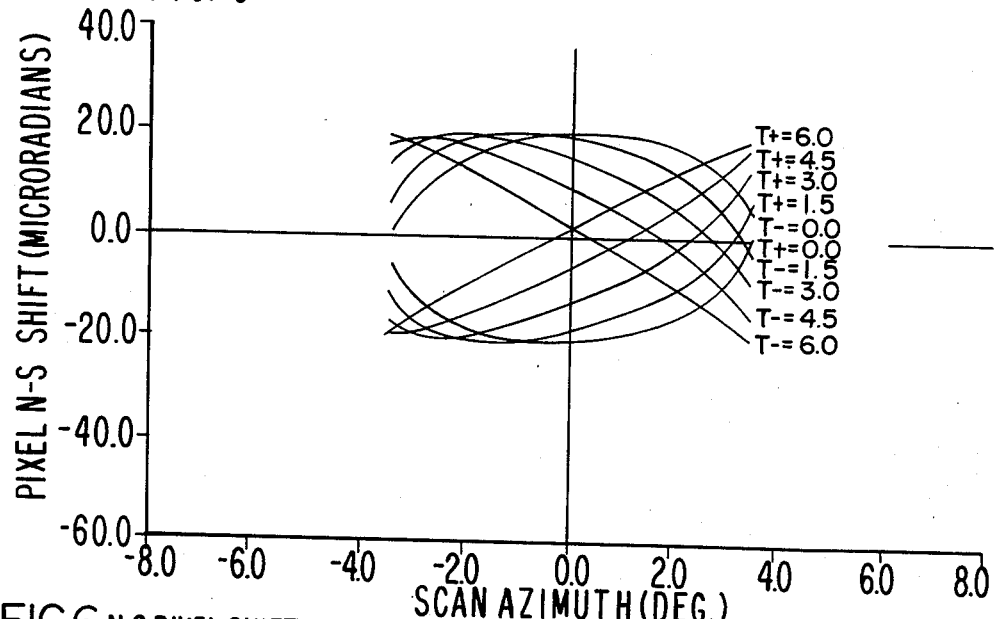
FIG.6 N-S PIXEL SHIFT GROWTH WITHIN THE 85-MINUTE IMAGING OR SOUNDING INTERVAL AS A FUNCTION OF SCAN AZIMUTH FOR A SCAN ELEVATION OF 8°

ONBOARD STEP COMPENSATION

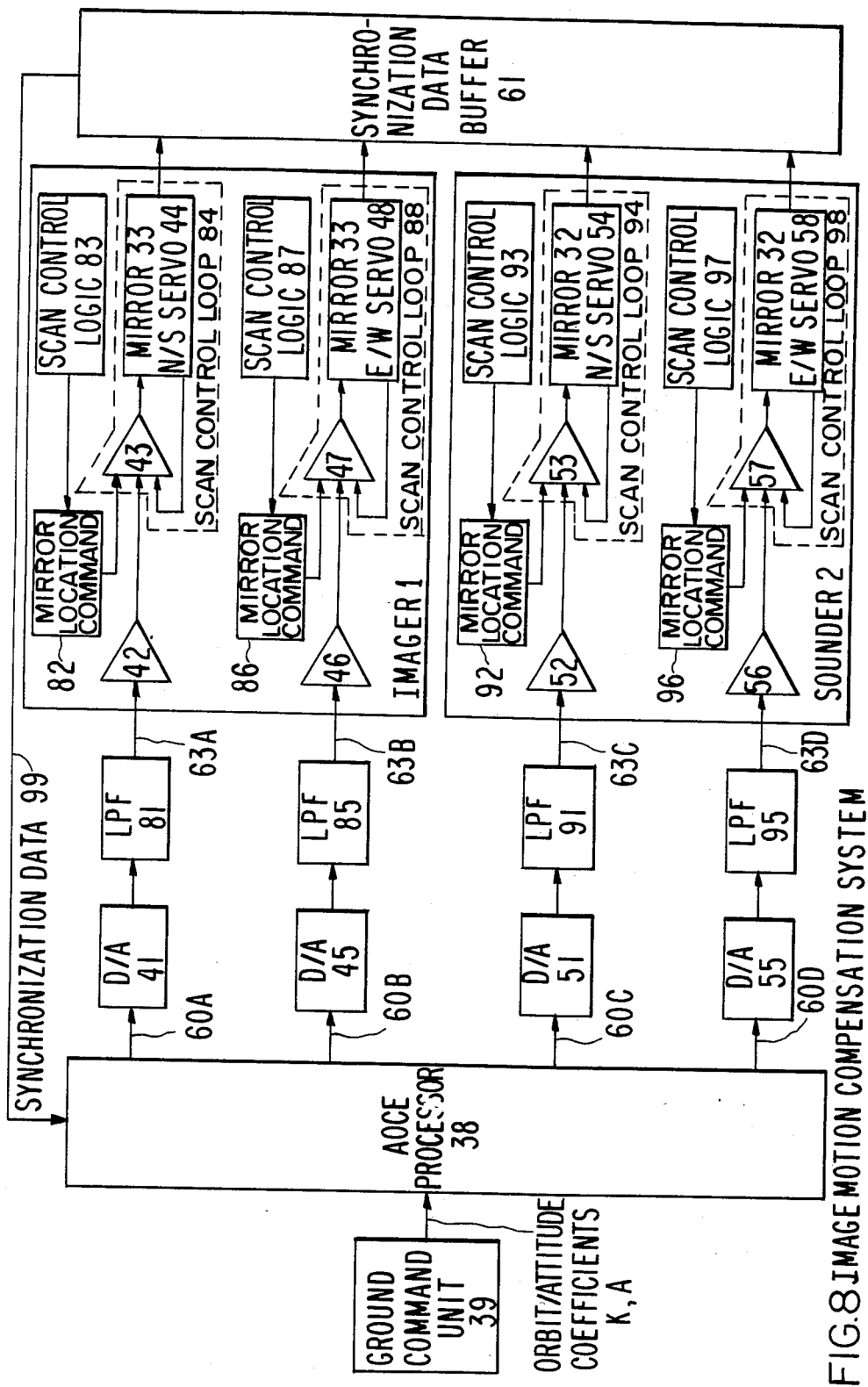

SPACECRAFT CAMERA IMAGE REGISTRATION

STATEMENT OF GOVERNMENTAL INTEREST

The invention described herein was made in the performance of work under NASA contract no. NAS5-29500 and is subject to the provisions of §305 of the National Aeronautics and Space Act of 1958 (72 Stat. 435; 42 USC 2457).

TECHNICAL FIELD

This invention pertains to the field of maintaining within a preselected limit the angular separation of corresponding pixels of repeated images of the same selected imaging area of a spacecraft camera.

BACKGROUND ART

U.S. Pat. No. 3,952,151 discloses a method and apparatus for stabilizing an image produced by e.g., a camera on board a satellite, by sensing the instantaneous attitude displacement of the satellite and using these signals to adjust the image-generating beam at the ground station. The instant invention differs from the reference system in that: (1) It is a closed-loop system whereas the reference system is an open-loop system. (2) It does not require the gyroscopes needed by the reference system. Gyroscopes are heavy, consume much power, are not very accurate, have a stability and drift problem, and normally require an onboard star tracker for calibration. (3) It corrects for orbit and thermal variations as well as attitude control variations, whereas the reference system corrects for just attitude control variations. (4) It uses the camera 1, 2 itself to self-correct for errors whereas the reference system does not.

Secondary patent references are U.S. Pat. Nos. 3,223,777; 3,676,581; 3,716,669; 3,769,710; 3,859,460; 4,012,018; and 4,300,159.

The following three items give a general description of portions of the invention:

(1) D. W. Graul (one of the instant inventors), oral presentation accompanied by a posterboard display before the Environmental Research Institute of Michigan at its International Symposium on Remote Sensing of the Environment, Oct. 21, 1985; (2) "New GOES to Sharpen Severe Weather Tracking", *Aviation Week and Space Technology,* Dec. 23, 1985; and (3) A. Schwalb, "Envirosat-2000 Report; GOES-Next Overview", National Oceanic and Atmosptheric Administration, September, 1985 (pages 25, 26, 28, 32, 35, 36).

DISCLOSURE OF INVENTION

One or more cameras (1, 2) onboard a spacecraft generates images of scenes external to the spacecraft, such as on the earth. Long term motion pertubations on the orbit and attitude of the spacecraft are determined as part of operations ground equipment (OGE). This information, in the form of coefficents (K, A), is periodically fed to an on-board computer (38), which, in response thereto, generates an image registration compensation signal (60). Signal (60) is sent to the servo control loops (84, 88, 94, 98) of the camera mirrors (33, 32).

BRIEF DESCRIPTION OF THE DRAWINGS

These and other more detailed and specific objects and features of the present invention are more fully disclosed in the following specification, reference being had to the accompanying drawings, in which:

FIG. 2 is a sketch of the field of view of camera 1,2 showing how the present invention achieves image motion compensation;

FIG. 3 is a graph showing the declination of a geosynchronous satellite having a 0.1-degree inclination;

FIG. 4 is a graph showing N-S pixel shift within an 85-minute imaging or sounding interval as a function of scan azimuth, for a scan elevation of 0 degrees for the satellite of FIG. 3;

FIG. 5 is a graph showing E-W pixel shift within an 85-minute imaging or sounding interval as a function of scan azimuth, for a scan elevation of 8 degrees for the satellite of FIG. 3;

FIG. 6 is a graph showing N-S pixel shift within an 85-minute imaging or sounding interval as a function of scan azimuth, for a scan elevation of 8 degrees for the satellite of FIG. 3;

FIG. 8 is a functional block diagram of the image motion compensation system (IMCS) portion of the present invention.

BEST MODE FOR CARRYING OUT THE INVENTION

Image registration is the process of limiting the error in the angular separation of corresponding pixels (with respect to each other) of repeated images of the same selected imaging area (frame) to within a specified preselected limit (for an example, see Table 1). The images are taken by one or more cameras 1, 2 onboard a spacecraft.

Figure 1:
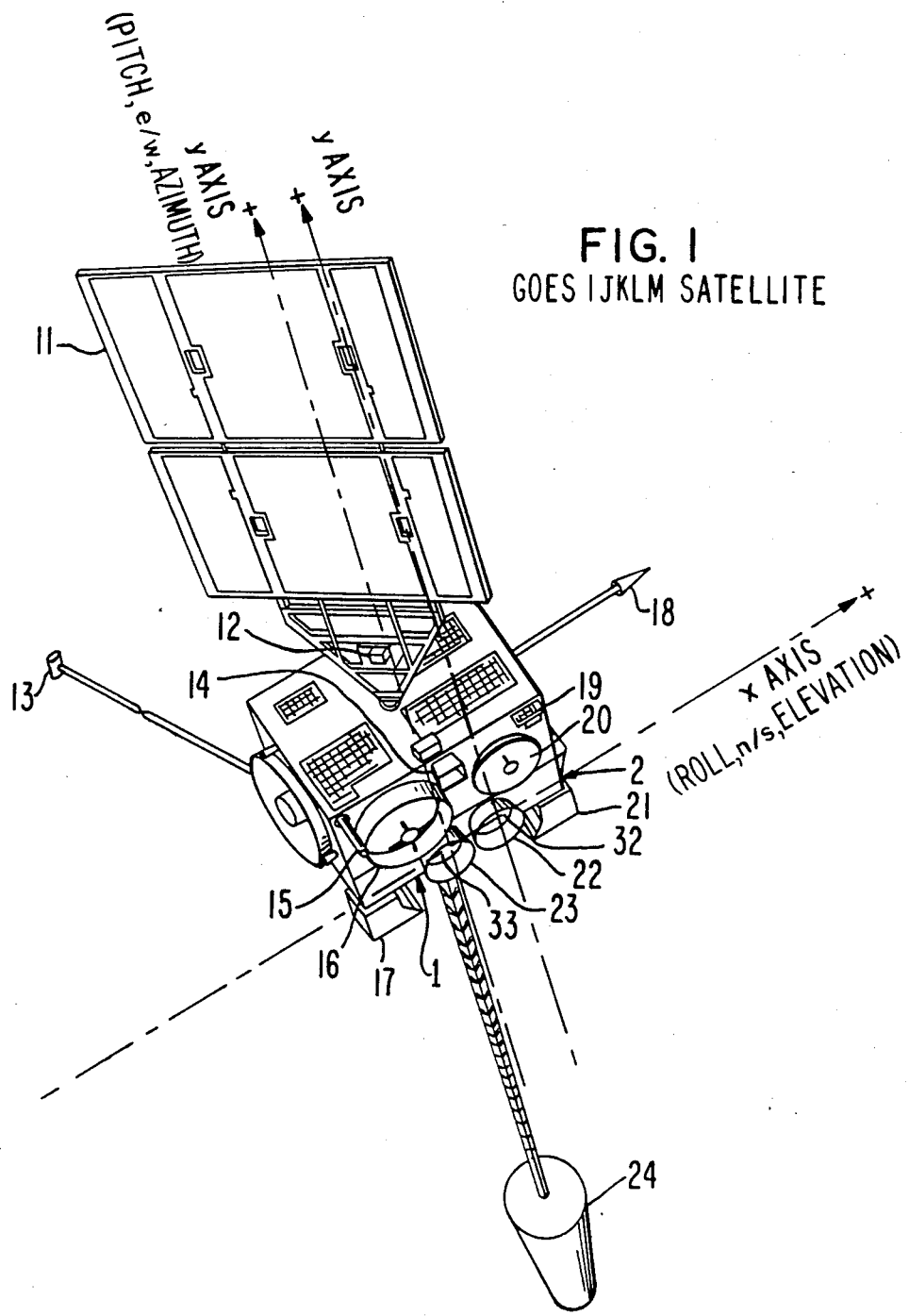
FIG. 1 is an elevational view of a satellite which can advantageously employ the present invention.

Although the present invention has utility on any type of spacecraft, it will be particularly illustrated with respect to the spacecraft shown in FIG. 1: one of the geosynchronous GOES IJKLM meteorological satellites sponsored by NOAA (National Oceanic and Atmospheric Administration) and contracted for by NASA (National Aeronautics and Space Administration). The items shown on FIG. 1 include solar array 11, x-ray sensor 12, magnetometor 13, S-band transmit antenna 14, search and rescue antenna 15, UHF antenna 16, telemetry and command antenna 18, earth sensors 19, S-band receive antenna 20, solar sail 24, and two cameras: imager 1 and sounder 2. Imager 1 comprises cooler 17, aperture 23, and mirror 33. Sounder 2 comprises cooler 21, aperture 22, and mirror 32.

The mirrors 33, 32 are each mounted on a two-axis gimbal which selectively positions the mirror 33, 32 with respect to orthogonal x and y axes at a very fast step-scan rate of many successive positions per second. The ostensibly common x axis can also be referred to as the roll, north/south, or elevation axis. The y axis for each mirror 33, 32 can also be referred to as the pitch, east/west, or azimuth axis.

Imager 1 provides multispectral radiometric imaging of the earth's surface, which can be useful, for example, in measuring transverse cloud velocity. Imager 1 has five channels, four infrared and one visible; its two-axis gimbaled scanning mirror 33 sweeps an eight kilometer longitudinal swath along an east/west path on the earth, providing co-registered data of the viewed scene from all channels simultaneously. Position and size of the area scanned are controlled by command from scan logic 83, 87 (FIG. 8). The field of view of imager 1 is divided into a set of parallel scan lines each comprising many pixels. The pixel size (on the earth) is as small as 1 km by 1 km for one of the channels. A scan frame (comprising many scan lines) is that subset of the total possible field of view that is commanded to be scanned. The scan frame is scanned in an amount of time known as the "correlation time", which is 22 minutes for a whole earth scan, less for an "area scan" (portion of the earth). Radiometric calibration is provided by periodic mirror 33 slews to space and to an internal blackbody target.

Sounder 2 measures moisture content and temperature within the earth's atmosphere on a pixel-by-pixel basis. Sounder 2 comprises a 19 channel (18 infrared and 1 visible) discrete filter wheel radiometer; its two-axis gimbaled scanning mirror 32 step-scans a 40 kilometer longitudinal swath across an east/west path in 10 kilometer increments. The nominal pixel size (on the earth) is 10 km by 10 km. A scan frame (comprising many scan lines) is scanned in an amount of time known as the correlation time. Passive radiation cooler 21 controls the filter wheel assembly temperature. This allows operation at lower tempterature for increased sensitivity. Radiometric calibration is provided by periodic mirror 32 slews to space and to an internal blackbody target.

Imager 1 and sounder 2 operate independently and simultaneously over a period of time known as an imaging or sounding "interval". The interval is specified to be at least 85 minutes and can be as much as 12 hours. During an interval, several frames are scanned and several images made. At the end of the interval, the instruments 1, 2 are turned off and the spacecraft may enter the housekeeping mode, e.g., to fire thrusters for purposes of attitude control or momentum dumping.

The total pixel registration error is the sum of the N-S and E-W separation angles between centroids of corresponding pixels for successive images within an imaging or sounding interval. Needless to say, the lower the pixel registration error, the higher the quality of images emanating from instruments 1, 2.

The present invention achieves the GOES IJKLM image registration accuracy requirements (shown in Table 1) with margin.

TABLE 1

| GOES IJKLM Image Registration Requirements in Microradians (3 sigma) | | |
|---|---|---|
| | Within 85 min Imaging/Sounding Interval | Between two Consecutive Imaging/Sounding Intervals |
| Imager 1 | | |
| East–West | 42 | 336 |
| North–South | 42 | 336 |
| Sounder 2 | | |
| East–West | 66 | 336 |
| North–South | 66 | 336 |

The present invention eliminates deterministic long-term motion effects on image registration in a closed-loop real-time fashion using an onboard image motion compensation system (IMCS), which operates directly on the mirrors 33, 32, and a model of orbital and attitude motion located on the earth. The invention is transparent to the user. The mirror 33, 32 normal motion is slow enough for the compensation system's computer 38 to apply effective E-W (azimuth) and N-S (elevation) corrections simultaneously.

The long-term motion effects compensated by the present invention include orbital inclination and orbital eccentricity (orbital effects); and yaw error, structural thermal distortion, and earth sensor 19 thermal variation (attitude effects).

FIG. 2 shows scan lines, with respect to a Mercator projection of the earth, traced by imager 1 or sounder 2 with and without pixel shift due to orbit/attitude perturbations. The shift has been exaggerated in the Figure for purposes of illustration. It is desired that the scan lines be horizontal. In reality, mirrors 33, 32 follow arcuate paths to accomplish this, due to the earth's curvature. Another consequence of the earth's curvature is that the sizes of the pixels on the earth vary.

The scan line with pixel shift depicted in FIG. 2 is skewed in both elevation and azimuth, although the azimuth skew can't be detected just by looking at FIG. 2 since the normal motion of the scan line is horizontal. The onboard compensation involves a stepped sequence of incremental adjustments ($\Delta AZ$, $\Delta EL$) that are applied to the azimuth and elevation servo control loops 88, 98, 84, 94 (FIG. 8) while the mirrors 33, 32 are generating scan lines. The correction signal 60 is applied in a direction opposite that of the undesired offset of the mirror 33, 32. In the example shown in FIG. 2, the correction ($\Delta AZ$, $\Delta EL$) is applied in an east-south direction to compensate opposing motion (west-north) of the mirror 33, 32. This correction signal 60 is updated every 64 milliseconds along the scan line. When the compensated scan line is seen by the user, it appears very similar to a scan line with no pixel shift.

Figure 7:
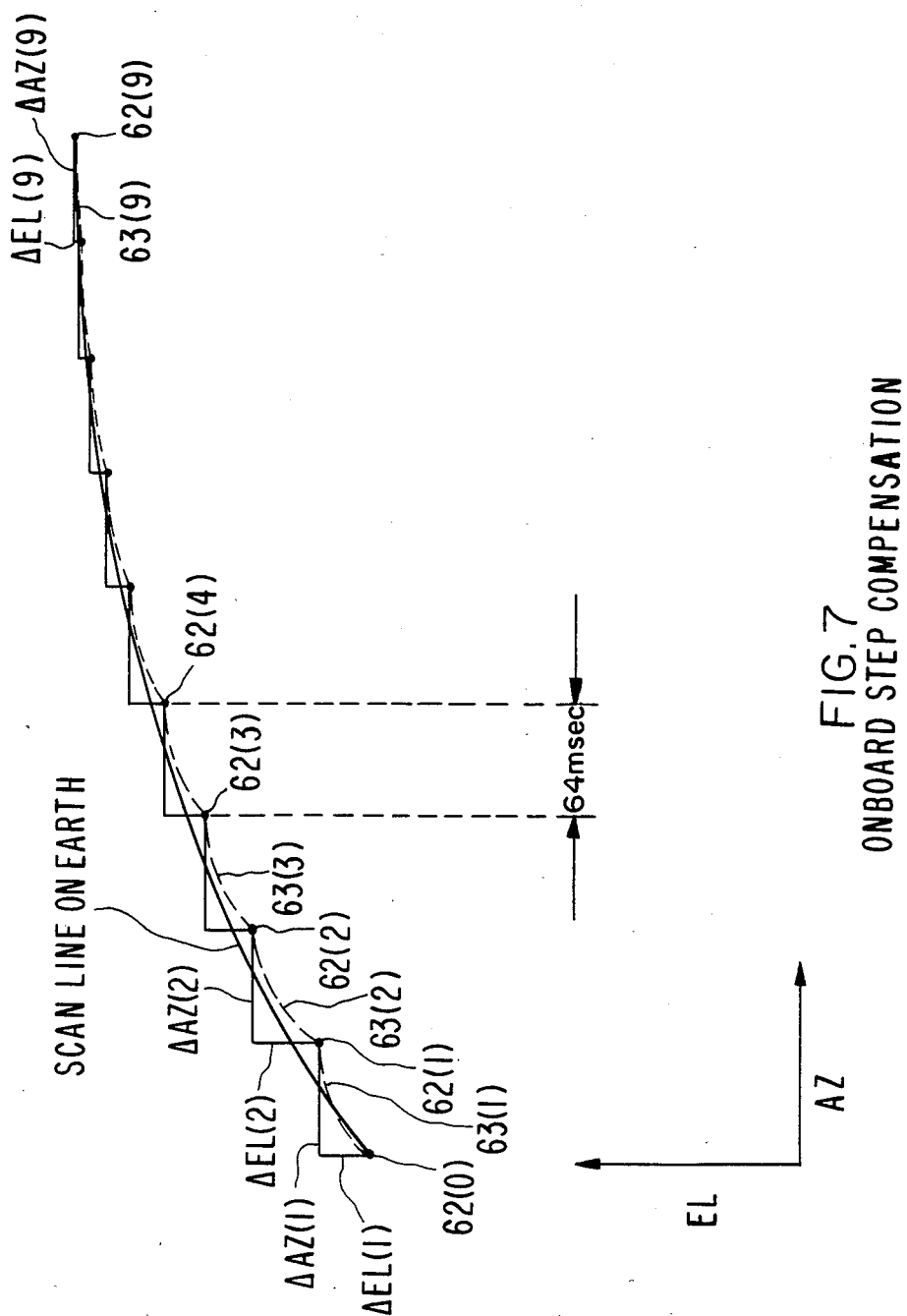
FIG. 7 is a sketch showing how the present invention uses onboard step compensation to compensate a scan line.

Further details of the compensation are illustrated in FIG. 7. Points 62 demarcate the beginning and end of each 64 msec compensation period. During each such period, computer 38 calculates a $\Delta AZ$, $\Delta EL$ correction signal 60. Signal 60 is converted to analog form and low pass filtered by filters 81, 85, 91, 95, resulting in a smoothing of the compensation signal into the dashed form 63 depicted in FIG. 7. This smoothed signal 63 is then fed to the servo loops 84, 88, 94, 98, in four independent components 63A, B, C, D corresponding to the two axes x, y of each of the two instruments 1, 2. The time constant of each low-pass filter 81, 85, 91, 95 is selected such that the error in each smooth segment 63(n) is about 10% of the input step size $\Delta EL(n)$, where n is a positive integer. n ranges from 1 through 14 to cover the entire scan line. In FIG. 7, n is shown ranging from 1 through 9.

For imager 1, the maximum residual error after compensation is less than 2 microradians. For sounder 2, the residual error is even smaller because of the slower stepping rate of mirror 32 compared with mirror 33.

An orbital inclination perturbation will now be illustrated. Other long-term image shifts are similar. The spacecraft ground track (declination) due to a 0.1° inclination is shown in FIG. 3. FIGS. 4 through 6 show the effect of the 0.1° inclination on pixel shift at two elevation angles (0°, 8°) at various times T (in hours) along the spacecraft ground track shown in FIG. 3. The east-west ptixel shift for 0° elevation is not shown because it is zero. 8° is considered an extreme elevation angle, because when the instrument 1, 2 is pointed at the earth, its maximum elevation angle is 8.7° in either direction, for a total elevation range of 17.4° (when the instrument 1, 2 is pointing at stars, its maximum elevation range is 21°).

Only a single 6-hour track is shown in FIGS. 4–6 because the remaining 8-hour tracks are mirror images of the illustrated 6-hour track about the meridian or the equator. In FIGS. 4–6, negative and positive indices after the symbol T indicate shifts at the beginning and end of the 85 minute imaging or sounding interval, respectively.

The constant E-W shift shown in FIG. 5 can be corrected relatively simply, by insertion of a fixed bias into signal 60 at the beginning of each scan line. More complicated shifts, such as the N-S shifts of FIGS. 4 and 6, are corrected as shown in FIG. 7, by stepping along the scan line at the rate of once every 64 msec (once per 1.25° for imager 1).

FIG. 8 shows the hardware comprising the IMCS portion of the invention. AOCE (attitude and orbit control electronics) processor 38 resides on board the spacecraft; provides the azimuth and elevation corrections 60 to imager 1 and sounder 2 in four independent components 60 A, B, C, D corresponding to the two axes x, y of each of the two instruments 1, 2; and synchronizes the signal 60 magnitude with real-time information 99 indicating the beginning and end of each scan line, the direction of each scan line, the position (AZ, EL) of each mirror 33, 32, and the operating mode of each camera 1, 2.

The azimuth corrections 60B, 60D and elevation corrections 60A, 60C are each a function of the mirror 33, 32 position (AZ, EL); a set of orbit/attitude compensation coefficients K, A; and synchronization data 99. Coefficients K, A are updated to processor 38 daily by command unit 39 associated with a ground portion of an image navigation system. A suitable image navigation system is more fully described in a commonly assigned U.S. patent application being filed concurrently herewith, entitled, "Satellite Camera Image Navigation".

The daily uplinked coefficients K, A are: seven orbital coefficients K (six orbital elements and one epoch time (beginning of a particular orbit/attitude variation)); and 25 attitude coefficients A (four for each of roll, pitch, and yaw of imager 1 and sounder 2, plus epoch time).

The six-element set of orbital coefficients A is used to provide orbit position predictions between coefficient updates. The attitude coefficients A are not simply instantaneous estimates of instrument 1, 2 roll, pitch, and yaw relative to the orbit, but are estimates of attitude model parameters, as will be explained in more detail below.

An additional 12 coefficients K, A are uplinked via ground command unit 39 during the first imaging and sounding interval after each stationkeeping or eclipse, using a quadratic series in time or exponential function, respectively, as the attitude model.

Compensation signal 60 is converted to analog form by 10-bit D/A converters 41, 45, 51, 55, then filtered by low pass filters 81, 85, 91, 95. In the resulting analog signal 63, 21 microradians corresponds to one volt. This signal 63 has a maximum value of ±10 volts, which is sufficient for all required compensations during the 85-minute imaging or sounding interval. If signal 63 had a dynamic range of 6000 microradians rather than 210 microradians, fixed gridding would be possible, i.e., pixels would have the same geographic coordinates for indefinitely long (and not just 85 minute) imaging and sounding intervals.

Preferably, a redundant computer and D/A converters are provided to back up processor 38 and D/A converters 41, 45, 51, 55, respectively.

Mirror servos 44, 48, 54, 58, which may comprise inductosyns, provide synchronization data buffer 61 with real-time information indicating the beginning and end of each scan line; the direction of each scan line; the position (AZ, EL) of each mirror 33, 32; and the operating mode (normal, star sensing, area scan, space or blackbody calibration) of each camera 1, 2. This information is fed back from data buffer 61 to processor 38 in digital form 99 for purposes of synchronizing the compensation signal 60. For example, the AZ/EL portion of the feedback signal uses 32 bits for each mirror 33, 32.

The algorithm, residing in a ROM within computer 38, for calculating the compensation signal is as follows:

$\Delta AZ = -A(Q)AZ\Delta R_s - B(Q)\Delta H_s - EL(z-W_s) - y$ $\Delta EL = -A(Q)EL\Delta R_s - B(Q)\Delta L_s + AZ(z-W_s) - x$ $A(Q) = [\cos Q - C(Q)]^{-1}$ $B(Q) = A(Q)C(Q)$ $C(Q) = [\cos^2 Q - 1 + (R_e/R_s)^2]^{\frac{1}{2}}$ $\cos Q = \cos AZ \cos EL$ (for star sighting, $A(Q)=0$, $B(Q)=-1$)

$R_e$ = earth's radius = 6378.16 km $R_s$ = geosynchronous radius = 42164.4 km $\Delta AZ, \Delta EL$) = pixel position compensation 60 components (azimuth, elevation)

(AZ, EL) = mirror 33, 32 position (azimuth, elevation)

$\Delta R_s$ = normalized radius deviation from geosynchronous radius = $e(\sin M - \sin M_I)$ $\Delta H_s$ = longitude deviation from perigee crossing = $2e(\sin M - \sin M_I)$ $\Delta L_s$ = satellite latitude = $i(\sin G - \sin G_I)$ $W_s$ = satellite orbital rotation = $i(\cos G - \cos G_I)$ i = orbital inclination G = argument of the latitude = $M + w$ w = argument of perigee M = mean anomaly = $n(t-t_o) + M_o$ $M_I$ = mean anomaly at middle of imaging/sounding interval = $n(t-t_I) + M_o$ e = eccentricity n = mean motion t = time $t_o$ = time at epoch $t_I$ = time at middle of interval $M_o$ = mean anomaly at epoch x, y, z = instrument 1, 2 reference optical axes (roll, pitch, yaw) relative to middle of imaging/sounding interval.

Variables for the above algorithm are stored in a RAM within processor 38.

The values of x, y, and z are each modeled as a trigonometric (harmonic) series in time. For example:

$x = A_1 \sin wt + A_2 \cos wt + A_3 \sin 2wt + A_4 \cos 2wt - (A_1 \sin wt_I + A_2 \cos wt_I + A_3 \sin 2wt_I + A_4 \cos 2wt_I)$ These attitude models include terms up to the second harmonic in each of roll, pitch, and yaw for each instrument 1, 2. wt represents the apparent daily motion of the sun about the spacecraft. Constant terms, if present, represent fixed alignment biases. Amplitudes of the harmonics (given by the coefficients $A_1$ through $A_4$ in the above example) represent daily variations due to solar radiation pressure effects on yaw, structural thermal distortions, and earth sensor 19 thermal drift. All these perturbations are periodic, and result from the sun's apparent daily motion about the spacecraft. Harmonic series are used to model the compensation algorithm because the effects being compensated are periodic. These sources of daily variation are not determined separately; rather, their collective effects are characterized through the coefficients A in the trigonometric series.

For the illustrated GOES IJKLM satellites, the orbit/attitude effects are measured by onboard star and landmark sensing, and by range information. The satellite attitude is nominally controlled by the use of magnetic torquers, earth sensors 19, and momentum wheels.

The baseline IMCS digital logic has a linear range of ±210 microradians with a resolution of 0.41 microradians per least significant bit (LSB). The LSB is defined by the resolution of the digital-to-analog converters 41, 45, 51, 55.

The predicted repeatability error of the total IMCS circuit over spacecraft life is less than 0.62 microradians. This 0.62 microradian repeatability error emanates from D/A circuits 41, 45, 51, 55; low pass filters 81, 85, 91, 95; and buffer amplifiers 42, 46, 52, 56. The compensation algorithm is embedded in digital form within processor 38; therefore, this portion of the circuit is repeatable and has no drift effect due to aging. The nonlinearity of each D/A circuit 41, 45, 51, 55 is less than ±0.05% maximum over the full inptut range. Since one LSB=1/1024 (about 0.1%) of full scale, the ±0.05% is equivalent to ±0.5 LSB=±0.21 microradians. This nonlinearity effect is a nonthermal random phenomenon which is not compensated by the present invention.

Scan control loops 84, 88, 94, 98 are servo error-correcting systems driven by commands emanating from mirror location command units 82, 86, 92, 96. These commands tell the mirror 33, 32 the position (AZ, EL) it should be in, based upon logic decisions made by scan control logic 83, 87, 93, 97. Feedback amplifiers 43, 47, 53, 57 comprise high stability resistive networks; the variation of gain of these amplifiers over their life is less than one LSB (0.41 microradian).

The scan loop 84, 88, 94, 98 response is deterministic, based on the following: knowledge of the input signals to summing amplifiers 43, 47, 53, 57; knowledge of the scan loop transfer function (response as a function of input); in-flight testing, conducted as part of the startup operation, to compare star and landmark locations with compensation to their locations without compensation; and continuous in-flight calibration of the IMCS as part of the overall scan loop calibration. The residual error in the scan loop 84, 88, 94, 98 is defined to be the response of the scan loop minus the input to the scan loop.

The total diurnal thermal error within the cameras 1, 2 is less than 0.741 microradian. This is a periodic attitude measurement effect and is thus compensated by the present invention.

The IMCS circuit was tested over the acceptance test temperature range of −15° C. to +40° C. for drift variation. The drift variation was shown to be less than one LSB. The temperature coefficient of the D/A converters 41, 45, 51, 55 is specified to be less than 15 ppm/°C. maximum. Since the diurnal thermal variation on D/A's 41, 45, 51, 55 is expected to be less than ±5° C. daily, the drift variation of the D/A's due to temperature is $15 \times 10^{-6} \times 5 = 0.0075\%$, equivalent to 0.075 LSB=0.031 microradian.

The imager 1/sounder 2 buffer amplifiers 42, 46, 52, 56, which receive the filtered analog compensation signals 63, are common mode rejection amplifiers each having a gain of 1; each is followed by a high stability (4 picoradian/°C.) analog summing amplifier 43, 47, 53, 57. The external temperature variation on these amplifier circuits during a daily cycle is anticipated to be less than ±5° C. Amplifier gains and stability are established to maintain deviation below 0.71 microradian peak after compensation.

Although the above periodic externally-caused thermal errors are small, the present invention compensates for their effects as part of the overall long-term compensation loop. This is made possible because observations of stars and earth-based landmarks are made directly by the instruments 1, 2 themselves. Star observations are typically made every 30 minutes, and landmarks every 2 hours during daylight. The results of these observations, along with ranging measurements made by equipment located on the ground, are used to determine satellite orbit and instrument 1, 2 attitude, and, in turn, used to make periodic updates to the coefficients K, A sent by ground command unit 39 to processor 38. Thus, satellite orbit/attitude effects are compensated by the compensation loop.

If the orbital and attitude perturbations were identical from one day to the next, a set of coefficients K, A once determined would remain valid throughout the life of the spacecraft, and there would be no need for instruments 1, 2 to make periodic star and landmark observations. However, there are small day to day changes in these perturbations. These changes result from: seasonal changes in yaw, thermal distortion, and earth sensor 19 variations due to the sun's change in declination; and from secular drifts in mirror 33, 32 scan system performance due to such aging effects as variation in servo control loop voltage, servo gain, and component degradation.

By continually updating the model coefficients K, A through on-board star and landmark observations, all of these effects are incorporated, resulting in a continual calibration of the mirror 33, 32 compensation. This calibration does not disrupt any normal operations of the instruments 1, 2.

The operations ground equipment (OGE) comprises orbit and attitude estimation software, which computes predicted landmark and star locations and "measurement residuals". Measurement residuals are the difference between the landmark and star locations predicted by the OGE, on the one hand; and the landmark and star locations as measured by cameras 1, 2, on the other hand. The calculation of the measurement residuals uses the same model and parameters that processor 38 uses in generating the image motion compensation signal 60, thus insuring that the residuals properly reflect the true day-to-day changes in the orbit and attitude perturbations. The generation of measurement residuals requires that compensation signal 80 be applied during star and landmark sightings as well as during earth scans. During a star or landmark sighting, processor 38 applies the compensation voltage 60 appropriate to the time t of the star or landmark sighting and its position (AZ, EL) in the instrument aperture 23, 22.

In order to serve as a meaningful quality check of the entire range of the compensation signal 60, the stars and landmarks should be well distributed over the entire instrument 1, 2 field of view.

The OGE provides a continual quality monitoring of the compensation system. With a properly operating system, because of the frequency of star sightings and attitude model updates, the measurement residuals will normally be small. Any continued increase in these residuals above a controllable preselected threshold causes an alert message to be generated.

The OGE provides an additional continuous quality check on the invention as follows. As part of the data stream continuously telemetered to the ground is sent the compensation signal 60; the AZ, EL of each mirror 33, 32; and the error (feedback) signal leaving each servo 44, 48, 54, 58. The OGE computer has stored therein a duplicate of the compensation algorithm embedded within processor 38. This duplicate algorithm takes the telemetered information and calculates $\Delta AZ$ and $\Delta EL$, then compares these calculated values of $\Delta AZ$ and $\Delta EL$ with the telemetered values of $\Delta AZ$ and $\Delta EL$. They should coincide if the system is operating properly.

The present invention addresses the problem of long-term errors that imptact image registration, Short-term stability errors are also present, and arise from two sources: spacecraft platform stability errors, and scan repteatability errors. The spacecraft platform stability errors have three sources: motion of the spacecraft in pitch and roll due to earth sensor 19 noise (the primary error), errors from mirror 33, 32 motive interaction, and the effects of solar array 11 drive operation, Scan repeatability errors are due to fixed pattern noise of the inductosyn servos 44, 48, 54, 58; one-cycle errors; sine/cosine unbalances; second harmonic errors; bearing noises; bearing friction; wire drag; and servo transient errors.

The mirror 33, 32 interaction errors and solar array 11 drive effect errors can be compensated for by the invention known as "Pointing Compensation System for Spacecraft Instruments" described in U.S. patent application Ser. No. 802,121 filed Sept. 30, 1985, and commonly assigned with the instant invention. Spacecraft motion compensation logic 25 of said patent application can be implemented as part of processor 38 described herein.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Apparatus for limiting the error, to within a preselected limit, in the angular separation of corresponding pixels (with resptect to each other) of repeated images of the same selected imaging area of a spacecraft camera, said apparatus comprising:
   on board the spacecraft, means for pointing the camera towards a scene external to the spacecraft;
   at a location external to the spacecraft, means for determining long-term motion perturbations on the orbit and attitude of the spacecraft; and
   coupled to said determining means, means for periodically communicating to a computer on board the spacecraft a representation of said long-term motion perturbations;
   whereby the computer generates an image registration compensation signal in response to said representation, and sends said compensation signal to the pointing means.

2. The apparatus of claim 1 wherein the spacecraft further comprises a second camera; wherein the compensation signal maintains, within a preselected limit, the angular separation of corresponding pixels of repeated images of the same selected imaging area of the second camera.

3. The apparatus of claim 1 wherein the long-term motion perturbations that are compensated for include at least one of the set of perturbations comprising orbital inclination, orbital eccentricity, yaw error, structural thermal distortion, and earth sensor thermal variation.

4. The apparatus of claim 1 wherein the representation comprises a harmonic series having a set of coefficients representing the effects of the sun's apparent rotation about the spacecraft on spacecraft attitude and thermal variations.

5. The apparatus of claim 1 wherein the camera periodically observes stars and landmarks;
   the spacecraft telemeters the star and landmark observations to the external location; and
   the external location incorporates said observations into the representation of the long-term motion perturbations.

6. The apptaratus of claim 5 wherein the following method is used to check the quality of the apparatus:
   at the external location, generate a model of predicted star and landmark locations;
   at the external location, form a set of measurement residuals defined as the difference between predicted locations of the stars and landmarks, on the one hand, and locations of the same stars and landmarks as measured by the camera and telemetered by the spacecraft, on the other hand; and compare the measurement residuals with preselected quality thresholds.

7. The apparatus of claim 1 wherein the pointing means comprises:
   a mirror disposed to face said external scene;
   a gimbal for positioning the mirror in a wanted direction with respect to each of two orthogonal axes; and
   a drive means for selectively activating the gimbal and thereby partially pivoting the mirror about each of the two axes; wherein
   the compensation signal is applied to said drive means.

8. The apparatus of claim 7 further comprising apparatus to command the gimbal to scan across the imaging area in a series of scan lines; wherein
   the representation comprises a set of orbital and attitude coefficients; and
   the computer further takes into account when calculating the compensation signal real-time information indicating the beginning and end of each scan line, the direction of each scan line, the mirror position, and the camera's operating mode.

9. The apparatus of claim 7 wherein:
   the spacecraft telemeters to the external location the compensation signal, the position of the mirror with respect to each axis, and a servo signal by which the drive means activates the gimbal;
   the external location, using means identical to those used by the computer, calculates a test compensation signal based on the telemetered mirror position and servo signal; and
   the external location compares the compensation signal with the test compensation signal as a quality check on the apparatus.

* * * * *